(12) United States Patent
Brown et al.

(10) Patent No.: US 7,294,273 B2
(45) Date of Patent: Nov. 13, 2007

(54) PROCESS FOR TREATMENT OF ORGANIC CONTAMINATED WATER

(76) Inventors: Jess C. Brown, 8969 Province St., Sarasota, FL (US) 34240; Chance V. Lauderdale, 6134 Turnbury Park Dr., Sarasota, FL (US) 34243; Robert S. Cushing, 8523 Great Meadow, Sarasota, FL (US) 34238

( * ) Notice: Subject to any disclaimer, the term of this patent is extended or adjusted under 35 U.S.C. 154(b) by 0 days.

(21) Appl. No.: 11/786,588

(22) Filed: Apr. 11, 2007

(65) Prior Publication Data

US 2007/0193950 A1 Aug. 23, 2007

Related U.S. Application Data

(63) Continuation-in-part of application No. 11/486,644, filed on Jul. 13, 2006, which is a continuation-in-part of application No. 11/287,180, filed on Nov. 26, 2005, now abandoned.

(51) Int. Cl.
*C02F 3/00* (2006.01)

(52) U.S. Cl. ..................... 210/610; 210/617

(58) Field of Classification Search ............ 210/610, 210/617, 615, 618, 616
See application file for complete search history.

(56) References Cited

U.S. PATENT DOCUMENTS

2006/0096915 A1 * 5/2006 Sumino et al. ............ 210/601

OTHER PUBLICATIONS

Newcombe, Gayle, "The Role of Biological Filtration in the Removal of Algae Metabolite using GAC," presented Apr. 6-10, 2003.*

* cited by examiner

*Primary Examiner*—Chester T. Barry
(74) *Attorney, Agent, or Firm*—Dennis W. Beech

(57) ABSTRACT

The present invention may be used in methods for treatment of drinking water contaminated with algal metabolites. An inflow of water in a drinking water treatment facility may have multiple types of algal metabolites wherein each algal metabolites has a concentration of less than 20 µg/l. The water may contain indigenous bacteria that may serve as a bioreactor inoculum. The water may be dosed with a biodegradable electron donor at a concentration of less than 7 mg/l to form water, electron donor solution. The water, electron donor solution may be processed through a fixed-bed bioreactor for an empty bed bioreactor contact time of less than 30 minutes. An effluent of the fixed-bed bioreactor may have an algal metabolite concentration for each algal metabolite of less than 10 ng/l.

7 Claims, 1 Drawing Sheet

PROCESS FOR TREATMENT OF ORGANIC CONTAMINATED WATER

This is a continuation-in-part application of U.S. patent application Ser. No. 11/486,644, filed Jul. 13, 2006 that is a continuation-in-part of U.S. patent application Ser. No. 11/287,180, filed Nov. 26, 2005 now abandoned. U.S. patent application Ser. No. 11/486,180 is pending.

BACKGROUND OF THE INVENTION

This invention relates to methods and processes for supplemental substrate treatment for biological control of algal metabolites and other organic contaminants. The new method may dose a process water stream with a readily biodegradable electron donor prior to treatment in a biological reactor.

Many current processes may use preozonation that may be an expensive process in biological treatment of algal metabolites in drinking water. Ozonation may form disinfection by-products that may be deleterious to human health. The presence of objectionable taste and odor compounds in surface water supplies may be a growing problem for water utility suppliers. Two common surface water compounds are 2-methylisoborneol and trans-1, 10-dimethyl-trans-9 decalol (geosmin), which are metabolites of cyanobacteria, blue-green algae, and actinomycetes bacteria.

Existing methods for mitigating algal metabolite impacts on drinking water may include algal population control through water reservoir management and metabolite removal at a water treatment facility. The growth of copper resistant algal strains and increased nutrient loading to surface waters may limit the effectiveness of reservoir management. Conventional treatment methods, such as pre- and post-chlorination, coagulation, sedimentation and filtration may be marginally effective at reducing algal metabolite concentrations.

Powdered activated carbon may be used in existing methods to supplement the processes to achieve acceptable removal of metabolites; although, such use may be cost prohibitive over lengthy or intense algal events. Some water processing utilities may ozonate settled water and then feed the water to biologically active granular media filters. The ozonation process may directly oxidize metabolites and may also oxidize natural organics to form assimilable organic carbon that may in turn provide a electron donor for microorganisms present in a biological filter. The ozone enhanced biofiltration process may be effective in water treatment, but may be costly and may have limited robustness, for example, diminished removal performance during fluctuations in feed water parameters.

Microorganisms may gain energy to grow and maintain cell metabolism by mediating the transfer of electrons between electron donor and electron acceptor. Primary electron donors may provide energy during cell metabolism. The rate of cell synthesis may be proportional to the concentration of a rate limiting electron donor, the cell yield, the concentration of active biomass, and the maximum specific primary electron donor utilization rate. The minimum concentration of primary electron donor that may support steady state biomass may be known as $s_{min}$. When the rate limiting primary electron donor concentration equals $s_{min}$, the rate of cell synthesis may equal the rate of cell decay. Any electron donor that may be present below its $s_{min}$ concentration may be known as a secondary electron donor. Though secondary electron donors may be biodegraded, bacteria may gain little to no energy in doing so, which may mean a primary electron donor may have to be biodegraded simultaneously. The rate of secondary electron donor degradation may be proportional to the concentration of active biomass present that may be a function of, among other factors, the concentration of primary electron donor.

Algal metabolites and other organic contaminants may be present in natural waters at parts per trillion or parts per billion concentrations and therefore may be biodegraded as secondary electron donors by indigenous microbial populations. Therefore, biological treatment processes designed to biodegrade these compounds may require the presence of a primary electron donor. The ozonation portion of an ozone enhanced biofiltration process may provide some direct oxidation of algal metabolites and may also break large natural organic matter molecules into smaller, more readily biodegradable organic molecules, thereby increasing the concentration of primary electron donors. The ozone enhanced biofiltration process may provide some success in removing algal metabolites from drinking water; however, potential disinfection by-product formation, lengthy bioacclimation time requirements, and inadequate removal efficiency and process robustness may limit full-scale use. A method that may provide a biological filter with an easily biodegradable primary electron donor at a controlled dose may allow a more efficient and robust process.

SUMMARY OF THE INVENTION

The present invention is directed to methods for treatment of drinking water contaminated with algal metabolites. An inflow of water may have multiple types of algal metabolites wherein each algal metabolite may have a concentration of less than 20 µg/l. The water may contain indigenous bacteria that may serve as a bioreactor inoculum. The water may be dosed with a biodegradable electron donor at a concentration of less than 7 mg/l to form a water, electron donor solution. The water, electron donor solution may be processed through a fixed-bed bioreactor for an empty bed contact time of less than 30 minutes. An effluent of the fixed-bed bioreactor may have an algal metabolite concentration for each algal metabolite of less than 10 ng/l.

These and other features, aspects and advantages of the present invention will become better understood with reference to the following drawings, description and claims.

DETAILED DESCRIPTION

Figure 1:
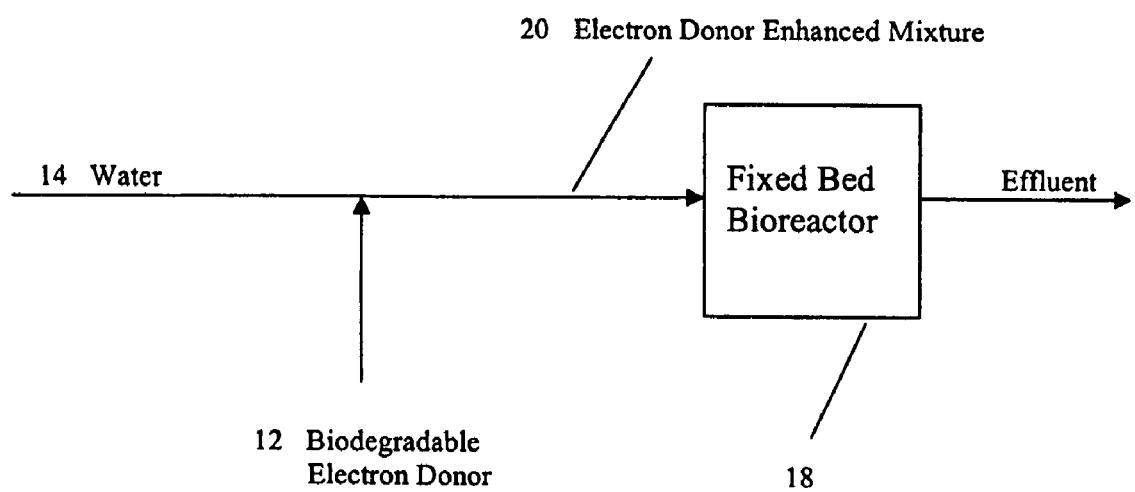
FIG. 1 illustrates a flow diagram of the process according to an embodiment of the invention.

The following detailed description represents the best currently contemplated modes for carrying out the invention. The description is not to be taken in a limiting sense, but is made merely for the purpose of illustrating the general principles of the invention.

Referring to FIG. 1, a method 10 for treatment of water 14 that may be being processed in a drinking water treatment facility with supplemental electron donor addition for biological control of algal metabolites and other organic contaminants may have an easily biodegradable electron donor 12, for example, acetic acid, acetate, ethanol, glucose, corn syrup, and the like, dose mixed with influent water 14 prior to treatment in a biological reactor 18. The biodegradable electron donor 12 may be dosed as a primary electron donor to the water 14 of a water treatment facility to enhance organic degradation, for example, where contaminants are too low in concentration to serve as primary electron donors. The water 14 may be a settled water effluent in a water treatment plant wherein the settled water may have been processed in a coagulation, flocculation and sedimentation or like process. The influent water may contain indigenous microbial degraders, native to the water source, that may serve as bioreactor inoculum. The bioreactor may be seeded by the water inoculum during operation without the need for culture isolation and/or enrichment. For best results the electron donor 12 may be fed into the water 14 just prior to entry of the mixture 20 into a bioreactor 18 or as the last step prior to processing the mixture 20 in a bioreactor 18. The method 10 may be performed intermediate the inflow of water 14 into the drinking water treatment facility and prior to the last or final disinfection stage.

The compound 12 dosed as a primary electron donor may be controlled for dosing over a wide range of concentrations depending on the requirements of treatment facility site water conditions. Potable water quality may be used and may result in a wide range of acceptable water quality at a site and from site-to-site. The bioreactors 18 may be suspended growth reactors, granular media fixed-bed reactors, or membrane based fixed-film reactors.

Experiments have demonstrated that a fixed-bed reactor may be the most effective process element for the electron donor enhanced biodegradation method 10. The metabolic activity of a biofilm may be more stable than that of suspended cultures. A gradient of redox potential and nutrient concentrations may be developed across the depth of the reactor bed that may promote microbial diversity and species richness, and may allow resilience to shock loads.

The support media for the fixed-bed bioreactor 18 may be granular activated carbon as the granular activated carbon may have a high surface area that may allow for increased biological growth. Granular activated carbon may have an intrinsic adsorptive characteristic that may act as a buffer to a process during feed water or electron donor addition anomalies.

Experiments in a bench scale project have demonstrated the ability to remove algal metabolites at concentration levels of 50 to 100 ng/l under varying conditions in a fixed-bed bioreactor using F-400 granular activated carbon as the support media in the bioreactor. The treatment process was capable of removing organic contaminants from drinking water to a level of less than 10 ng/l with an empty bed contact time of 10 minutes and an acetic acid dose of 2 mg/l as carbon. Operating parameters may vary depending on the water source. In this experiment, the biomass present in the bioreactor may have used the dosed electron donor and the naturally occurring assimilable electron donors present in the process water as primary electron donors.

The method for treatment of drinking water may have water 14 influent that may have various algal metabolite concentrations of less than 20 µg/l for each algal metabolite type. A biodegradable electron donor at a concentration of less than 7 mg/l may be used to dose the water 14 to form a water, electron donor solution or substrate enhanced mixture 20. The water, electron donor solution may be processed through a biologically active granular media filter 18 for an empty bed contact time of less than 30 minutes. The effluent of the biologically active granular media filter 18 may have various algal metabolite concentrations of less than 10 ng/l for each algal type.

The method 10 treatment removes the necessity to ozonate the water 14 and thereby may reduce costs and creation of the unwanted by-products of ozonation. The use of a fixed-bed bioreactor may make the method 10 cost effective for water treatment facilities that have existing plants that may already have granular media filters in place.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for treatment of drinking water contaminated with algal metabolites comprising:
    inflow of a water in a drinking water treatment facility having a plurality of algal metabolites wherein each algal metabolite has a concentration of less than 20 µg/l;
    dosing a biodegradable electron donor at a concentration of less than 7 mg/l to said water to form a water, electron donor solution;
    processing said water, electron donor solution through a fixed-bed bioreactor for an empty bed contact time of less than 30 minutes wherein indigenous microorganisms present in said water serve as algal metabolite degraders and fixed-bed reactor inoculum; and
    recovering an effluent of said fixed-bed bioreactor having an algal metabolite concentration for each algal metabolite of less than 10 ng/l.

2. The method as in claim 1 wherein said water is a settled water.

3. The method as in claim 1 wherein said water is an influent to said drinking water treatment plant.

4. The method as in claim 1 wherein said fixed-bed bioreactor is a biologically active granular media filter.

5. The method as in claim 4 wherein a support media for said biologically active granular media filter is selected from the group consisting of granular activated carbon, sand, and anthracite.

6. The method as in claim 1 wherein said dosing is performed as a last step prior to processing in said fixed-bed bioreactor.

7. The method as in claim 1 wherein said biodegradable electron donor is acetic acid.

* * * * *